United States Patent [19]
Shackelford

[11] Patent Number: 4,574,086
[45] Date of Patent: Mar. 4, 1986

[54] METHOD FOR RETARDING DEGRADATION OF FOOD COLORS AND FLAVORS

[75] Inventor: John R. Shackelford, LaGrange, Ill.

[73] Assignee: Hercules Incorporated, Wilmington, Del.

[21] Appl. No.: 258,373

[22] Filed: Apr. 28, 1981

Related U.S. Application Data

[63] Continuation-in-part of Ser. No. 150,298, May 16, 1980, abandoned, which is a continuation-in-part of Ser. No. 967,077, Dec. 6, 1978, abandoned.

[51] Int. Cl.$^4$ ............................................. A23L 1/272
[52] U.S. Cl. ...................................... 426/62; 426/262
[58] Field of Search ................ 426/51, 250, 270, 331, 426/615, 62, 262, 540, 650, 651, 533; 435/177

[56] References Cited

U.S. PATENT DOCUMENTS

| | | | |
|---|---|---|---|
| 2,832,688 | 4/1958 | Huang et al. | 426/51 |
| 2,863,805 | 12/1958 | Todd | 426/51 |
| 2,928,740 | 3/1960 | Rosenthal et al. | 426/62 |
| 2,946,688 | 7/1960 | Rosenthal et al. | 426/62 |
| 3,008,832 | 11/1961 | Gorsica | 426/651 |
| 3,041,249 | 6/1962 | Chen et al. | 426/62 |
| 3,126,287 | 3/1964 | Finkle | 426/51 |
| 3,336,141 | 8/1967 | Frisina | 426/250 |
| 3,627,539 | 12/1971 | Ishii et al. | 426/62 |
| 3,906,116 | 9/1975 | Quesnel et al. | 426/602 |
| 3,959,494 | 5/1976 | Starkie | 426/62 |
| 4,001,480 | 1/1977 | Shank | 426/62 |
| 4,027,042 | 5/1977 | von Elbe et al. | 426/51 |
| 4,252,836 | 2/1981 | Akin et al. | 426/62 |

Primary Examiner—Hiram H. Bernstein
Attorney, Agent, or Firm—Dale R. Lovercheck

[57] ABSTRACT

Dried yeast products, when used as a carrier for vegetative food flavors or colors, act to retard loss of color or flavor and to prevent gain of unpleasant unnatural color or flavor during storage of dry food ingredient blends.

7 Claims, No Drawings

METHOD FOR RETARDING DEGRADATION OF FOOD COLORS AND FLAVORS

CROSS-REFERENCE TO RELATED APPLICATIONS

This application is a continuation-in-part of application Ser. No. 150,298, filed May 16, 1980, now abandoned, which is a continuation-in-part of application Ser. No. 967,077, filed Dec. 6, 1978, now abandoned.

BACKGROUND OF THE INVENTION

1. Field of the Invention

This invention relates to improved food composition having stable natural colors and flavors, to methods of retarding loss of flavor and color and to methods for preventing the generation of unpleasant colors and flavors during storage of foods. More particularly, the invention relates to retardation of color and flavor loss and the prevention of the production of unpleasant flavors and colors in dry food ingredient blends.

2. Description of the Prior Art

Loss of flavor and color in some foods during storage is a prevalent problem throughout the food industry. Faded colors, although not necessarily reflecting poor quality in terms of taste or nutrition, impart less aesthetic appeal and can greatly affect product sales. Such flavor loss or color fading frequently is the result of photo-oxidation upon exposure to light. Similarly, many nutritious foods can acquire unpleasant or unnatural flavors or colors during storage, which can make foods unpleasant to consume. In foods containing a large amount of liquid, such as pourable emulsion food systems (i.e., salad dressings), industry practice has been to add small amounts of antioxidants or chelating agents. Two commonly used antioxidants are butylated hydroxyanisole (BHA) and butylated hydroxytoluene (BHT). Both are effective, particularly when used together to take advantage of their synergistic effect. A commonly used chelating agent is calcium disodium EDTA (ethylenediamine tetraacetate). Yeasts, which are known to possess antioxidant properties, have also been included in many such formulations and probably inherently serve to stabilize colors and flavors in such liquid systems even though the yeasts are included for different purposes.

The use of antioxidants and chelating agents in dry blends, however, has not always been successful. This may in part be due to the fact that the levels allowed by the Food and Drug Administration (FDA) are commonly insufficient to be generally effective.

Complete dry blends of ingredients including sugar, salts, spices, flavors and colorants combined with dehydrated vegetable portions can be purchased for the commercial production of foods. The dry blends packaged in convenient large unit sizes result in labor savings to the food processor since the scaling or portioning of each individual ingredient is left to efficient specialists called seasoning blenders. These seasoning blenders prepare unit packages by the pallet load and shipment is made from the blender's warehouse to that of the food processors. The seasoning blender prepares relatively large batches to increase his efficiency and the food processor purchases the material by the truck or car load to minimize freight costs. The processor then warehouses his purchased blend until required for use. The resultant total storage time for the food blend can be several weeks or more with the result that color and flavor change is a constant problem.

For example, oleoresin paprika or oleoresin celery is a widely used food color or flavor in dry blends. Dextrose crystals are commonly used as a carrier, as is salt, sucrose, monosodium glutamate, and other solids compatible in food systems to which the color and flavor additives will adhere. The natural appearance and taste of natural colors and flavors begin to degrade upon incorporation into the total seasoning blend. Consequently, the seasoning blender has difficulty in insuring the food processor that his finished product will have uniform color and flavor. Antioxidants and chelating agents have commonly been employed to protect the color and flavor of such products as oleoresin paprika and oleoresin celery in dry seasoning blends but their effectiveness has not been uniformly satisfactory. Clearly there exists a need for an additive for dry blends that will effectively reduce flavor or color loss of a variety of vegetative additives.

It is therefore an object of this invention to provide a method for retarding color loss of dry blends containing vegetative additive extracts.

It is a further object of this invention to retard color or flavor loss of dry blends containing oleoresin flavor, a flavor oil, or a color additive.

These and other objects will become apparent from the remainder of this specification and claims.

SUMMARY OF THE INVENTION

In one aspect, the invention resides in a method for stabilizing the color of natural vegetative colors and flavors in dry blends comprising mixing the natural vegetative additives with a stabilizing concentration of a dried yeast product and introducing the resulting mixture into the dry food blend.

The term "dried yeast product" means any yeast material containing not more than about 20 weight percent moisture. Suitable "dried yeast products" include dried *Candida utilis*, dried *Saccharomyces cerevisiae*, dried *Saccharomyces carlsbergensis* and dried *Kluyveromyces fragilis*, although all dried edible, palatable yeast products are included within the scope of this invention. Of particular importance are the dried yeast products derived from yeasts which have been subjected to autolysis or extraction. In this aspect it has been discovered that the water soluble fraction of the autolyzed yeast is most responsible for the color-stabilizing activity of the autolyzed yeast products. Autolysis is a well known process wherein the yeast is digested by its own enzymes or by additional exogenous enzymes. No special treatments are apparently necessary to obtain the product properties useful in this invention, although the ability to stabilize flavors and colors of natural vegetative additives appears to be proportional to the degree of autolysis. "Dried yeast products" also include textured yeast products, which typically contain large amounts of other protein sources such as soy or wheat products. Such textured yeast products are well known in the art and are most commonly produced by cooking-extrusion.

The flavors and colors of natural vegetative products can be preserved and disagreeable flavors and colors can be prevented from forming in a variety of extracts used to impart colors and flavors to dried blends. Natural vegetative color additives include oleoresin paprika, oleoresin turmeric, annatto and carotene. Natural flavors include oleoresins and flavor oils. Oleoresin flavors that can be used include spice oleoresins which include celery, clove, coriander, black pepper, etc, herb oleoresins which include marjoram, oregano, etc. Flavor oils include such spice oils as clove, coriander, nutmeg, etc., and herb oils such as marjoram, oregano, sage, etc.

In another aspect, the invention resides in a dry mixture containing a color-stabilizing concentration of a dried yeast product and a natural vegetative flavor or color additives. Any relative proportions of the natural additives and dried yeast products can be used to achieve a flavor- or color-stabilizing effect, and all proportions are within the scope of this invention. However, weight ratios of dried yeast product to natural additives which are lower than about 4 to 1 (i.e., less than about 80% dried yeast product) have generally been found to be progressively less effective as the relative amount of flavor or color extract is increased. An exception would be the yeast autolysate solubles, which are sufficiently effective at levels as low as about 10 weight percent based on the amount of natural additive.

The term "dry food blend" means any mixture of food ingredients containing less than about 20 weight percent moisture, as water, in the absence of encapsulators or adsorption agents. Soy mixtures can also contain up to 20 wt.% of animal or vegetable oil or other food compatable liquids depending on the capacity of the mixture to absorb the oil which is related to the surface area of the discrete particles in the blend. However, encapsulators such as gums, starches, gelatins, etc., and adsorption agents such as calcium silicate, tricalcium phosphate and silicone dioxide, etc., can be used in many dry blends to permit water content to reach levels as high as 80 weight percent or so. Such blends are also within the meaning of the term "dry blend" so long as the blend exhibits the textural properties and flow characteristics of typical dry blends containing less than about 20 weight percent water, which is normally in the form of free water or chemically bound water.

EXAMPLES

EXAMPLE 1

A dry blend of commercial spice extract (coriander oil) and oleoresin paprika plated out on dextrose crystals was prepared by intimately blending the two ingredients in a mixer until well-dispersed. The dry blend was stored at room temperature for extended periods of time and analyzed for ASTA (American Spice Trade Association) color value. See "Official Analytical Methods of the American Spice Trade Association, "Method No. 20.0 entitled "Extractable Color in Paprika, Other Capsicums and Their Oleoresins." The results shown below in Table I indicate the gradual loss of color with time which is representative of the behavior of many dry blends containing vegetative color extracts such as those previously described.

TABLE I

| Blend (Percent by Weight) | ASTA Color Values - Days at Room Temp. | | | |
|---|---|---|---|---|
|  | 0 | 44 | 74 | 130 |
| 97.13% Dextrose | 28.6 | 20.9 | 11.0 | 0.4 |
| 2.30% Oleoresin paprika |  |  |  |  |
| 0.57% Oil Coriander |  |  |  |  |

EXAMPLES 2 AND 3

Four different blend compositions in each of two separate test lots were evaluated for color upon storage for 7 and 14 days, respectively, at 120° F. (In each case the liquid ingredients were premixed before being combined with the solid ingredient in a Waring blender.) The results are shown below in Tables II and III. In each case the oleoresin paprika was preblended with the carrier before the remaining ingredients (if any) were added.

TABLE II (Test Lot 1)

| Blend (Percent by Weight) | ASTA Color Values - Days at 120° F. | |
|---|---|---|
|  | 0 | 7 |
| 97.2% Dextrose | 51.0 | 0 |
| 2.8% Oleoresin paprika |  |  |
| 97.1% Dextrose | 47.0 | 0 |
| 2.8% Oleoresin paprika |  |  |
| 0.1% Antioxidant solution (BHA, BHT in vegetable oil) |  |  |
| 96.5% Dextrose | 50.0 | 0.9 |
| 2.8% Oleoresin paprika |  |  |
| 0.7%–1% solution of Calcium Disodium EDTA |  |  |
| 97.2% Yeast (Spray-dried Candida utilis) | 50.0 | 43.0 |
| 2.8% Oleoresin paprika |  |  |

TABLE III (Test Lot 2)

| Blend (Percent by Weight) | ASTA Color Values - Days at 120° F. | |
|---|---|---|
|  | 0 | 7 |
| 97.2% Dextrose | 47.0 | 0.8 |
| 2.8% Oleoresin paprika |  |  |
| 97.1% Dextrose | 48.0 | 1.0 |
| 2.8% Oleoresin paprika |  |  |
| 0.1% Antioxidant solution (BHA, BHT) |  |  |
| 96.5% Dextrose | 51.0 | 1.1 |
| 2.8% Oleoresin paprika |  |  |
| 0.7%–1% solution of Calcium Disodium EDTA |  |  |
| 97.2% Yeast (Spray-dried Candida utilis) | 53.0 | 40.0 |
| 2.8% Oleoresin paprika |  |  |

These results show the effectiveness of dried yeast as a color-stabilizing carrier for oleoresin paprika as compared to conventional antioxidants and chelating agents normally effective in wet systems.

EXAMPLE 4

A chicken broth formulation was prepared according to the following formula (on a weight percent basis):

| 41.60% | Salt |
| 17.40% | Modified Starch |
| 15.96% | Sugar |
| 9.90% | Chicken Fat |
| 7.80% | MSG |
| 3.00% | Onion Powder |
| 3.00% | Oleoresin celery on dextrose |
| 1.04% | Oleoresin turmeric on carrier |
| .15% | Ground white pepper |
| .15% | Parsley flakes |
| 100.00% |  |

The oleoresin turmeric was first preblended with the carrier, which was either dextrose or spray-dried yeast (*Candida utilis*). The preblended oleoresin turmeric and carrier were then blended with the salt, fat, and sugar. The remaining ingredients were then added and blended until homogeneous.

The resulting chicken broth formulations were filled into glass jars and placed in a window exposed to sunlight. Once each day the jar contents were blended to allow more even exposure of the contents to the sunlight. After 15 days the samples were analyzed for the yellow color characteristic of chicken broth, which is due to the presence of curcumin. The results were as follows:

| Blend (Percent by Weight) | Color Value (Percent Curcumin) |
|---|---|
| 96.2% Dextrose<br>3.8% Oleoresin turmeric | 0.0008 |
| 96.2% Yeast (Spray-dried *Candida utilis*)<br>3.8% Oleoresin turmeric | 0.0020 |

The results show that the dried yeast carrier was effective relative to the control in reducing color loss of a dry blend containing oleoresin turmeric. Although this was still a considerable loss in curcumin, the color difference between the two samples was noticeable.

EXAMPLE 5

Several different dried yeast products were tested as carriers for their ability to enhance the color stability of oleoresin paprika in dry blends. The blended test samples were placed in glass jars, sealed, and held at room temperature under normal lighting. ASTA color values were determined by the approved procedure. The results were as follows:

| Blend (Percent by Weight) | ASTA Color Values - Days at Room Temp. | | |
|---|---|---|---|
| | 0 | 37 | 65 |
| 100% Ground paprika | 121 | 139 | 121.1 |
| 93.8% Dextrose<br>6.2% Oleoresin paprika | 123 | 22.9 | (negative) |
| 93.8% Ground extruded yeast-soy blend*<br>6.2% Oleoresin paprika | 131 | 101.7 | 54.5 |
| 93.8% Co-dried yeast-whey blend**<br>6.2% Oleoresin paprika | 124 | 103.4 | 66.4 |
| 93.8% Yeast (Spray-dried *Candida utilis*)<br>6.2% Oleoresin paprika | 126 | 109.6 | 87.2 |

*Extruded or textured proteinaceous products are well known products and can be made by a wide range of conditions and materials. This particular dried product was extruded from an initial dry ingredient mixture of about 30 weight percent yeast and about 70 weight percent soy flour, plus sufficient water to permit extrusion.
**The co-dried yeast-whey blend contained about 60 weight percent yeast and 40 weight percent whey solids (dry basis).

These results show that dried yeast products, i.e., dried products containing some yeast, also function to stabilize vegetative colors. As these results show, however, the effectiveness of the yeast product is lessened as the amount of yeast in the yeast product is reduced. Nevertheless, the yeast does continue to function even when present as an ingredient within a separate product.

EXAMPLE 6

The following samples were prepared in 100 gram batches:

| | % By Weight | % Yeast Solubles |
|---|---|---|
| 1. | 93% Dextrose<br>7% Oleoresin Paprika | 0 |
| 2. | 93% Dried Whole Yeast (*Candida utilis*)<br>7% Oleoresin Paprika | 17 |
| 3. | 93% Dried Autolyzed Yeast (*Candida utilis*)<br>7% Oleoresin Paprika | 35 |
| 4. | 93% Dried Autolyzed Yeast (*Candida utilis*)<br>7% Oleoresin Paprika | 70 |
| 5. | 93% Dried Autolyzed Yeast[1]<br>7% Oleoresin Paprika | 95 |
| 6. | 93% Dried Autolyzed Yeast[2]<br>7% Oleoresin Paprika | 95 |

[1]Nestle 8008 Autolyzed Yeast
[2]Nestle 8001 Autolyzed Yeast, Standard Dark Powder The samples were mixed with a mortar and pestle until a uniform product was made. Each sample was then divided into two portions and placed into polyethylene bags. One set of samples was placed into refrigeration for reference and the other into 37° C. storage conditions with no light source.

Each sample was tested prior to placement in storage for an initial ASTA color value. The samples were then tested again after two weeks and six weeks of storage at 37° C.

These color values were then used to calculate percent loss of color for each time period.

| Sample No. | ASTA Color Value | | | Percent Color Loss | |
|---|---|---|---|---|---|
| | 0 Time | 2 Weeks | 6 Weeks | 2 Weeks | 6 Weeks |
| 1 | 140.8 | 0 | 0 | 100 | 100 |
| 2 | 134.8 | 102.8 | 37.5 | 23.7 | 72.2 |
| 3 | 135.9 | 126.2 | 106.5 | 7.1 | 21.6 |
| 4 | 139.1 | 130.9 | 118.9 | 5.8 | 14.5 |
| 5 | 133.9 | 133.7 | 114.1 | .15 | 14.7 |
| 6 | 138.3 | 115.4 | 87.9 | 22.9 | 36.4 |

These results indicate that the autolyzed products (Sample Nos. 3, 4, 5, and 6) retain their color to a greater degree than the unautolyzed product (Sample No. 2) and dextrose (Sample No. 1). In general, the greater the degree of autolyzation, the greater the degree of color retention. Samples 4 and 5 are more autolyzed than Sample No. 3 and accordingly have retained the greatest percentage of color. Sample 6, although highly autolyzed, does not show this property. It is thought that this could be due to the treatment of this product to produce its dark brown color, which treatment is not publicly known. Nevertheless, all of the dried yeast product samples functioned better than the dextrose sample (1).

EXAMPLE 7

Samples were prepared as shown below. In each case the oleoresin paprika was premixed with the yeast material to ensure close contact.

| | Sample | Initial ASTA Value | Two Weeks Light Exposure | |
|---|---|---|---|---|
| | | | ASTA | % Loss |
| 1. | 93% Dextrose<br>7% Oleoresin Paprika | 95.6 | 0 | 100% |
| 2. | 93% Autolyzed Yeast<br>7% Oleoresin Paprika | 95.6 | 57.2 | 40% |
| 3. | 46.5% Autolyzed Yeast<br>46.5 Dextrose<br>7.0 Oleoresin Paprika | 97.5 | 51.2 | 47.4% |

-continued

| | Sample | Initial ASTA Value | Two Weeks Light Exposure | |
|---|---|---|---|---|
| | | | ASTA | % Loss |
| 4. | 18.6% Autolyzed Yeast | 97.0 | 44.3 | 54.3% |
| | 74.4 Dextrose | | | |
| | 7.0 Oleoresin Paprika | | | |
| 5. | 9.3% Autolyzed Yeast | 96.7 | 43.6 | 54.9% |
| | 83.7 Dextrose | | | |
| | 7.0 Oleoresin Paprika | | | |
| 6. | 0.93% Autolyzed Yeast | 92.4 | 22.7 | 75.4% |
| | 83.7 Dextrose | | | |
| | 7.0 Oleoresin Paprika | | | |

These results show that the color stability is directly proportional to the level of dried yeast product (autolyzed yeast) present in the sample. This also illustrates that the dried yeast material is effective over a wide range of concentrations.

EXAMPLE 8

The Influence of Yeast Solubles Level on Oleoresin Paprika Shelf-Life

| | | | ASTA Color Values | | |
|---|---|---|---|---|---|
| | | % Soluble | 0 Time | 2 Weeks | % Color Loss |
| 1. | 93% Dextrose | | 140.8 | 0 | 100% |
| | 7% Oleoresin Paprika | | | | |
| 2. | 93% Torula Yeast | 18 | 134.8 | 102.8 | 23.7% |
| | 7% Oleoresin Paprika | | | | |
| 3. | 93% Yeast Autolysate | 35 | 135.9 | 126.2 | 7.1% |
| | 7% Oleoresin Paprika | | | | |
| 4. | 93% Yeast Autolysate | 50 | 139.1 | 130.9 | 5.8% |
| | 7% Oleoresin Paprika | | | | |
| 5. | 93% Yeast Autolysate | 95 | 133.9 | 133.7 | .15% |
| | 7% Oleoresin Paprika | | | | |

These results show the effect of the degree of autolysis on the color stability. The samples with a higher percentage of solubles have been subjected to higher degrees of autolysis. As previously stated, it appears that the soluble fraction of the autolyzed yeast contains the active ingredient for stabilizing color. The yeast autolysate used in Sample No. 5 contained 95% solubles, which was obtained by separating out the cell debris from the soluble portion of the autolysate.

EXAMPLE 9

The Active Oxygen Method (AOM) measures the ability of an additive substance to prevent oxidative degradation of oils. In the test a portion of oil is placed in a tube containing a tube through which air is directed through the oil at 233 ml/sec. The peroxide content of the oil is measured and the test is repeated in the time period necessary to reach a level of oxidation equivalent to a disagreeable flavor in the oil.

| | Hours | % increase |
|---|---|---|
| Control | 14.0 | — |
| Yeast | 20.0 | 43% |

EXAMPLE 10

The effect of yeast on pork sausage flavor stability measured by the 2-thiobarbituric acid test (TBA) as reported in Journal of the American Oil Chemical Society, p. 37, #1 (January 1960).

| % Yeast in Pork Sausage | TBA Value* (mg/kg) |
|---|---|
| 0.0 | 1.19 |
| 0.8 | 0.94 |
| 1.35 | 0.96 |
| 3.15 | 0.77 |

*Lower values indicate suppressed oxidation and low rancid flavor.

The results of all of the foregoing examples clearly show that preblending of a natural vegetative color or flavor additive with a dried yeast product (carrier) effectively reduces color or flavor loss and prevents the food from acquiring unpleasant colors and flavors, in a dry blend. On the other hand, they also show the substantial inability of commonly used commercial antioxidants and chelating agents in conjunction with the normal carrier dextrose to produce a comparable effect. It is important in achieving the stabilizing effect that the vegetable flavor and color additives be preblended with the dried yeast product prior to blending with the remaining dry blend ingredients in order to maximize the surface contact of the extract with the yeast. The mechanism by which the yeast operates is not understood, but it appears that yeast products exhibiting more yeast surface area are more effective in reducing color loss.

It will be apparent to those skilled in the art that many variations from these examples, shown for purposes of illustration, can be made without departing from the scope of this invention. Thus, the invention resides solely in the claims appended hereinafter.

I claim:
1. A method for retarding loss of natural color and retarding the appearance of unnatural color in dry food blends consisting essentially of: mixing a natural vegetative oleoresin color additive with an amount of dried yeast product effective to stabilize the color of the additive to form a stabilized additive and then mixing the stabilized additive into a dry food to form a dry food blend having a stabilized color.
2. The method of claim 1 wherein the natural vegetative color additive comprises oleoresin paprika.
3. The method of claim 1 wherein the dried yeast product is selected from the group consisting of dried *Candida utilis*, dried *Saccaromyces cerevisiae*, *Kluyveromyces fragilis*.
4. The method of claim 1 wherein the natural vegetative additive is oleoresin paprika and the dried yeast product is dried *Candida utilis*.
5. The method of claim 1 wherein the dried yeast product is a textured yeast product.
6. The method of claim 1 wherein the dried yeast product is a yeast autolysate.
7. The method of claim 1 wherein the dried yeast product is the water soluble fraction of a yeast autolysate.

* * * * *